United States Patent Office 2,889,329
Patented June 2, 1959

2,889,329

HALO SUBSTITUTED POLYCYCLIC DERIVATIVES OF PYRIDINE AND PROCESS

John P. Luvisi, Park Ridge, Ill., assignor, by mesne assignments, to Universal Oil Products Company, Des Plaines, Ill., a corporation of Delaware No Drawing. Application October 15, 1957
Serial No. 690,218

21 Claims. (Cl. 260—290)

This invention relates to new compositions of matter comprising halo substituted polycyclic derivatives of nitrogen-containing heterocyclic compounds and more particularly to the polyhalo substituted polycyclic derivatives of pyridine.

It is an object of this invention to prepare new compositions of matter by condensing a halo substituted polycyclic compound and a nitrogen-containing heterocyclic compound.

A further object of this invention is to prepare halo substituted polycyclic derivatives of nitrogen-containing heterocyclic compounds which are useful as insecticides.

One embodiment of this invention is found in a process for preparing halo substituted polycyclic derivatives of nitrogen-containing heterocyclic compounds by condensing said nitrogen-containing heterocyclic compounds with a halo substituted polycycloalkadiene in the presence of an amide selected from the group consisting of alkali metal amides and alkaline earth metal amides in ammonia, and recovering the resultant halo substituted polycyclic derivatives of a nitrogen-containing heterocyclic compound.

A further embodiment of this invention is found in a process for preparing a halo substituted polycyclic derivative of a nitrogen-containing heterocyclic compound by condensing 3-picoline with a polyhalonorbornadiene in the presence of a amide selected from the group consisting of alkali metal amides and alkaline earth metal amides in ammonia, and recovering the resultant halo substituted polycyclic derivatives of a nitrogen-containing heterocyclic compound.

A specific embodiment of the invention is found in a process for preparing a halo substituted polycyclic derivative of a nitrogen-containing heterocyclic compound by condensing 1,2,3,4,7,9,9-heptachloro - 1,4,4a,5,8,8a-hexahydro-1,4,5,8-dimethanonaphthalene with 3-picoline in the presence of lithium amide in liquid ammonia, and recovering the resultant 3-[2-(5,6,7,8,9,9-hexachloro-1,4, 4a,5,8,8a - hexahydro - 1,4,5,8-dimethanonaphthyl)-methyl]-pyridine.

Another embodiment of the invention is found in a halo substituted polycyclic derivative of a nitrogen-containing heterocyclic compound.

Other objects and embodiments referring to alternative halo substituted polycyclic alkadienes, alternative nitrogen-containing heterocyclic compounds and alternative alkali metal and alkaline earth metal amides will be found in the following further detailed description of the invention.

It is now proposed that halo substituted polycyclic derivatives of a nitrogen-containing heterocyclic compound which comprise new compositions of matter and are prepared by condensing a halo substituted polycyclic alkadiene and a nitrogen-containing heterocyclic compound in a basic medium may find use in a wide variety of subjects in the chemical field. For example, the compound 4-(1,3,4,7,7-pentachloro-2,5-norbornadien - 2 - ylmethyl)-pyridine which is prepared by condensing 1,2,3, 4,7,7-hexachloro-2,5-norbornadiene and 4-picoline in a basic medium may be used as an insecticide, especially against houseflies. In addition, compounds of this nature may also be used as intermediates in the preparation of other compounds such as pharmaceuticals, resins, etc.

Nitrogen-containing heterocyclic compounds which may be used as one of the starting materials in the process of the present invention include the six membered cyclic compounds containing a nitrogen atom in the ring such as 2-picoline, 3-picoline, 4-picoline, 2,4-dimethylpyridine (2,4-lutidine), 2,5-dimethylpyridine, 2,6-dimethylpyridine, 3,4-dimethylpyridine, 2,4,6-trimethylpyridine (collidine), 2,3,4-trimethylpyridine, 2,3,6-trimethylpyridine, 2,5,6-trimethylpyridine, 2-ethylpyridine, 3-ethylpyridine, 4-ethylpyridine, 2,4-diethylpyridine, 2,5-diethylpyridine, 2,6-diethylpyridine, 3,4-diethylpyridine, etc.

Halo substituted polycyclic compounds which may be reacted with the aforementioned nitrogen-containing heterocyclic compounds include those compounds in which the halogen substituent has an atomic weight of from 35 to 127 (i.e. chlorine, bromine or iodine) the polycyclic alkadiene containing at least two halogen substituents. The term "halo substituted" as used in this invention will include mono-and polyhalo compounds, the preferred compounds being poly halo substituted. Examples of these compounds include 2,3-dichloro-2,5- norbornadiene, 1,2,3-trichloro-2,5-norbornadiene, 1,2,3,4-tetrachloro-2,5-norbornadiene, 1,2,3,4,7,7-hexachloro-2,5-norbornadiene, 1,2,3,4,5,7,7-heptabromo-norbornadiene, 1,2,3,4,5,6,7,7-octachloro-norbornadiene, 2,3-dibromo-2,5-norbornadiene, 1,2,3-tribromo-2,5-norbornadiene, 1,2,3, 4-tetrabromo-2,5-norbornadiene, 1,2,3,4,7,7-hexabromo-2, 5-norbornadiene, 1,2,3,4,5,7,7-heptabromo-norbornadiene, 1,2,3,4,5,6,7,7 - octachloronorbornadiene, 2,3-diiodo-2,5-norbornadiene, 1,2,3-triiodo-2,5-norbornadiene, 1,2,3,4-tetraiodo-2,5-norbornadiene, 1,2,3,4,7,7-hexaiodo-2,5-norbornadiene, 1,2,3,4,5,7,7-heptabromo-norbornadiene, 1,2, 3,4,5,6,7,7-octabromonorbornadiene, 1,2-dichloro-1,4,4a, 5,8,8a-hexahydro-1,4,5,8-dimethanonaphthalene, 1,2,3-trichloro-1,4,4a,5,8,8a-hexahydro-1,4,5,8 - dimethanonaphthalene, 1,2,3,4-tetrachloro-1,4,4a,5,8,8a-hexahydro-1,4,5, 8-dimethanonaphthalene, 1,2,3,4,6-pentachloro-1,4,4a,5,8, 8a-hexahydro-1,4,5,8-dimethanonaphthalene, 1,2,3,4,6,7-hexachloro-1,4,4a,5,8,8a-hexahydro-1,4,5,8 - dimethanonaphthalene, 1,2,3,4,6,9,9-heptachloro-1,4,4a,5,8,8a-hexahydro-1,4,5,8-dimethanonaphthalene, 1,2,3,4,6,7,9,9-octachloro-1,4,4a,5,8,8a-hexahydro-1,4,5,8 - dimethanonaphthalene, 1,2-dibromo-1,4,4a,5,8,8a-hexahydro-1,4,5,8-dihymethanonaphthalene, 1,2,3 - tribromo - 1,4,4a,5,8,8a-hexahydro-1,4,5,8 - dimethanonaphthalene, 1,2,3,4-tetrabromo-1,4,4a,5,8,8a-hexahydro-1,4,5,8 - dimethanonaphthalene, 1,2,3,4,6 - pentabromo-1,4,4a,5,8,8a-hexahydro-1,4,5,8 - dimethanonaphthalene, 1,2,3,4,6,7-hexabromo-1,4,4a,5,8,8a - hexahydro-1,4,5,8-dimethanonaphthalene, 1,2,3,4,6,9,9-heptabromo-1,4,4a,5,8,8a - hexahydro-1,4,5, 8-dimethanonaphthalene, 1,2,3,4,6,7,9,9 - octabromo-1,4, 4a,5,8,8a - hexahydro-1,4,5,8-dimethanonaphthalene, 1,2-diiodo-1,4,4a,5,8,8a-hexahydro - 1,4,5,8-dimethanonaphthalene, 1,2,3-tribromo - 1,4,4a,5,8,8a-hexahydro-1,4,5,8-dimethanonaphthalene, 1,2,3,4-tetraiodo - 1,4,4a5,8,8a-hexahydro - 1,4,5,8 - dimethanonaphthalene, 1,2,3,4,6-pentaiodo-1,4,4a,5,8,8a - hexahydro-1,4,5,8 - dimethanonaphthalene, 1,2,3,4,6,7 - hexaiodo-1,4,4a,5,8,8a-hexahydro - 1,4,5,8 - dimethanonaphthalene, 1,2,3,4,6,9,9-heptaiodo - 1,4,4a,5,8,8a-hexahydro-1,4,5,8 - dimethanonaphthalene, 1,2,3,4,6,7,9,9-octaiodo-1,4,4a,5,8,8a - hexahydro - 1,4,5,8-dimethanonaphthalene, etc. It is to be understood that the aforementioned nitrogen-containing heterocyclic compounds and halo substituted polycyclicalkadienes are only representative of the class of compounds which may be condensed according to the process of this invention, and that this invention is not necessarily limited thereto.

The reaction between the aforementioned nitrogen-containing heterocyclic compounds and the halo substituted polycyclic alkadienes is effected in a basic medium, said reaction occurring in the presence of an alkali metal or alkaline earth metal amide in ammonia, either in liquid or gaseous form depending upon the conditions under which the reaction proceeds. Alkali metal or alkaline earth metal amides which may be used include lithium amide, sodium amide, potassium amide, cesium amide, rubidium amide, magnesium amide, calcium amide, strontium amide, barium amide, etc.

The process of this invention will take place at temperatures in the range of from about −50° C. to about atmospheric temperature and at pressures ranging from atmospheric to about 100 atmospheres or more; the pressure used being dependent upon the temperature at which the reaction takes place. For example, if a temperature of approximately −50° C. is used the ammonia used in the reaction will be in the liquid phase and therefore atmospheric pressure may be used. However, if the reaction takes place at atmospheric temperatures, super-atmospheric pressures ranging up to about 100 atmospheres or more will be used in order to maintain the ammonia in a liquid phase. If such pressures are not used the reaction will then take place in the presence of gaseous ammonia.

The physical properties of the present halo substituted polycyclic derivatives of a nitrogen-containing heterocyclic compound and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal composition to the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention may be effected in any suitable manner and may comprise either a batch or a continuous type operation. For example, when a batch type operation is used, a condensation apparatus such as an alkylating flask is cooled to a temperature of approximately −50° C. by external means such as, for example, Dry Ice and the alkali metal or alkaline earth metal amide in liquid ammonia is added and a quantity of the nitrogen-containing heterocyclic compound is added thereto. The halo substituted polycyclic alkadienes and, if so desired, an inert organic solvent, is added. Organic solvents which may be used in this invention include aromatic hydrocarbons such as toluene, o-, m- and p-xylene, ethylbenzene etc.; ethers such as dimethyl ether, diethyl ether, dipropyl ether, saturated low molecular weight aliphatic hydrocarbons such as pentane, hexane, heptane, etc. The temperature of the flask is maintained at the desired level for a predetermined residence time while thoroughly admixing the contents of said flask. At the end of the desired residence time the flask and contents thereof are allowed to return to room temperature and the desired reaction product, comprising the halo substituted polycyclic derivative of a nitrogen-containing heterocyclic compound, is separated from unreacted starting materials and purified by conventional means such as fractional distillation, crystallization, etc.

Another method of effecting the condensation reaction of the present invention is by a continuous type operation. In this type of operation the starting materials comprising the halo substituted polycyclicalkadiene and the nitrogen-containing heterocyclic compound are continuously charged to a reactor which is maintained at the proper operating conditions of temperature and pressure. The basic medium is also continuously charged to the mixture through separate means or, if so desired, the alkali metal or alkaline earth metal amide may be admixed with one of the starting materials and charged thereto in a single stream while the ammonia either in liquid or gaseous form, depending upon the operating conditions of the reaction, is charged to said reactor in a separate line. After the predetermined residence time has been completed, the desired product is continuously withdrawn, separated from reactor effluent and purified by conventional means hereinbefore set forth, while said reactor effluent may be separated into its component parts which may be recharged to the reactor as a portion of the starting materials.

Examples of reaction products which are prepared according to the present process include 2-(3-chloro-2,5-norbornadien - 2 - ylmethyl)pyridine, 3 - (3 - chloro-2,5 - norbornadien - 2 - ylmethyl)pyridine, 4 - (3-chloro - 2,5 - norbornadien - 2 - ylmethyl)pyridine, 2-(1,3,4 - trichloro - 2,5 - norbornadien - 2 - ylmethyl)pyridine, 3 - (1,3,4 - trichloro - 2,5 - norbornadien - 2 - ylmethyl)pyridine, 4 - (1,3,4 - trichloro - 2,5 - norbornadien - 2 - ylmethyl)pyridine, 3 - (1,3,4 - tribromo - 2,5-norbornadien - 2 - ylmethyl)pyridine, 4 - (1,3,4 - tribromo - 2,5 - norbornadien - 2 - ylmethyl)pyridine, 2-(1,3,4,7,7 - pentachloro - 2,5 - norbornadien - 2 - ylmethyl)pyridine, 3 - (1,3,4,7,7 - pentachloro - 2,5 - norbornadien - 2 - ylmethyl)pyridine, 4 - (1,3,4,7,7 - pentachloro-2,5-norbornadien - 2 - ylmethyl)pyridine, 2 - (1,3,4,5,7,7 - hexachloro - 2,5 - norbornadien - 2 - ylmethyl)pyridine, 3 - (1,3,4,5,7,7 - hexachloro - 2,5 - norbornadien-2 - ylmethyl)pyridine, 4 - (1,3,4,5,7,7 - hexachloro - 2,5-norbornadien - 2 - ylmethyl)pyridine, 2 - (1,3,4,5,6,7,7-heptachloro - 2,5 - norbornadien - 2 - ylmethyl)pyridine, 3 - (1,3,4,5,6,7,7 - heptachloro - 2,5 - norbornadien - 2-ylmethyl)pyridine, 4 - (1,3,4,5,6,7,7 - heptachloro - 2,5-norbornadien - 2 -ylmethyl)pyridine, 2 - [2 - (5,6,7,8,9,9 - hexachloro - 1,4,4a,5,8,8a - hexahydro - 1,4,5,8 - dimethanonaphthyl)methyl] - pyridine, 2 - [2 - (5,6,7,8,9,9 - hexachloro - 1,4,4a,5,8,8a - hexahydro - 1,4,5,8 - dimethanonaphthyl)methyl] - pyridine, 3 - [2 - (5,6,7,8,9,9 - hexachloro - 1,4,4a,5,8,8a - hexahydro - 1,4,5,8 - dimethanonaphthyl)methyl] - pyridine, 4 - [2 - (5,6,7,8,9,9 - hexachloro - 1,4,4a,5,8,8a - hexahydro - 1,4,5,8 - dimethanonaphthyl)methyl] - pyridine, etc.

The following examples are given to illustrate the process of the present invention, which, however, are not intended to limit the generally broad scope of the present invention in strict accordance therewith.

*Example I*

Thirty-seven grams of 3-picoline is added over a fifteen minute period to a solution of 10 g. of lithium amide in 300–400 ml. of anhydrous liquid ammonia in an alkylating flask which is immersed in a Dry Ice bath and maintained at a temperature of −50° C. The mixture is stirred for two hours and 32 g. of 1,2-dichloro-2,5-norbornadiene diluted with an equal volume of anhydrous ether is added over about one-half hour. The mixture is stirred for an additional hour, at the end of which time the flask is removed from the Dry Ice bed and allowed to return to room temperature. The desired product comprising 3-(3-chloro-2,5-norbornadien-2-ylmethyl)-pyridine is separated from the unreacted starting materials by fractional distillation under reduced pressure.

*Example II*

A solution of 59 g. of 1,2,3,4,7,7-hexachloro-2,5-norbornadiene and 37 g. of 4-picoline is treated in the presence of a mixture of lithium amide in liquid ammonia in a manner similar to that set forth in Example I above. The reaction product is recovered, washed, dried and subjected to fractional distillation under reduced pressure, the desired product, comprising 4-(1,3,4,7,7-pentachloro-2,5-norbornadien-2-ylmethyl)pyridine being recovered therefrom.

*Example III*

A solution of 77 g. of 1,2,3,4,7,9,9-heptachloro-1,4,4a,5,8,8a-hexahydro-1,4,5,8-dimethanonaphthalene and 37 g. of 3-picoline are reacted in the presence of sodium amide and liquid ammonia in a manner similar to that set forth in Examples I and II above. The desired product, comprising 3-[2-(5,6,7,8,9,9-hexachloro-1,4,4a,5,8,8a-hexahydro-1,4,5,8-dimethanonaphthyl)-methyl]-pyridine is separated and recovered therefrom.

*Example IV*

An insecticidal solution is prepared by dissolving 1 g. of 3-[2-(5,6,7,8,9,9-hexachloro-1,4,4a,5,8,8a-hexahydro-1,4,5,8-dimethanonaphthyl)methyl]-pyridine in 2 cc. of benzene and adding 100 cc. of water using Triton X–100 as an emulsifying agent. This solution is sprayed into a cage containing common houseflies and causes a 100% knock-down.

I claim as my invention:

1. A process which comprises condensing an alkyl pyridine with a halo substituted polycycloalkadiene selected from the group consisting of halonorbornadienes and halohexahydrodimethanonaphthalenes in the presence of an amide selected from the group consisting of alkali metal and alkaline earth metal amides in liquid ammonia, and recovering the resultant condensation product.

2. A process which comprises condensing an alkyl pyridine with a polyhalonorbornadiene in the presence of an amide selected from the group consisting of alkali metal and alkaline earth metal amides in liquid ammonia, and recovering the resultant condensation product.

3. A process which comprises condensing an alkyl pyridine with a polyhalohexahydro-dimethanonaphthalene in the presence of an amide selected from the group consisting of alkali metal amides and alkaline earth metal amides in liquid ammonia, and recovering the resultant condensation product.

4. A process which comprises condensing 2-picolin with a halo substituted polycycloalkadiene selected from the group consisting of halonorbornadienes and halohexahydrodimethanonaphthalenes in the presence of an amide selected from the group consisting of alkali metal amides and alkaline earth metal amides in liquid ammonia, and recovering the resultant condensation product.

5. A process which comprises condensing 3-picoline with a halo substituted polycycloalkadiene selected from the group consisting of halonorbornadienes and halohexahydrodimethanonaphthalenes in the presence of an amide selected from the group consisting of alkali metal amides and alkaline earth metal amides in liquid ammonia, and recovering the resultant condensation product.

6. A process which comprises condensing 4-picoline with a halo substituted polycycloalkadiene selected from the group consisting of halonorbornadienes and halohexahydrodimethanonaphthalenes in the presence of an amide selected from the group consisting of alkali metal amides and alkaline earth metal amides in liquid ammonia, and recovering the resultant condensation product.

7. A process which comprises condensing a picoline with a polychloro-2,5-norbornadiene in the presence of an amide selected from the group consisting of alkali metal and alkaline earth metal amides in liquid ammonia, and recovering the resultant condensation product.

8. A process which comprises condensing a picoline with a polychloro-hexahydro-dimethanonaphthalene in the presence of an amide selected from the group consisting of alkali metal and alkaline earth metal amides in liquid ammonia, and recovering the resultant condensation product.

9. A process for the preparation of a halo substituted polycyclic derivative of a nitrogen-containing heterocyclic compound which comprises condensing 3-picoline with 1,2-dichloro-2,5-norbornadiene in the presence of lithium amide in liquid ammonia, and recovering the resultant 3-(3-chloro-2,5-norbornadien-2-ylmethyl)pyridine.

10. A process for the preparation of a halo substituted polycyclic derivative of a nitrogen-containing heterocyclic compound which comprises condensing 1,2,3,4-tetrachloro-2,5-norbornadiene with 3-picoline in the presence of lithium amide in liquid ammonia, and recovering the resultant 3-(1,3,4-trichloro-2,5-norbornadien-2-ylmethyl)-pyridine.

11. A process for the preparation of a halo substituted polycyclic derivative of a nitrogen-containing heterocyclic compound which comprises condensing 1,2,3,4,7,7-hexachloro-2,5-norbornadiene with 4-picoline in the presence of lithium amide in liquid ammonia, and recovering the resultant 4 - (1,3,4,7,7-pentachloro-2,5-norbornadien-2-ylmethyl)pyridine.

12. A process for the preparation of a halo substituted polycyclic derivative of a nitrogen-containing heterocyclic compound which comprises condensing 1,2,3,4,7,9,9 - heptachloro - 1,4,4a,5,8,8a - hexahydro - 1,4,5,8 - dimethanonaphthalene with 3-picoline in the presence of sodium amide in liquid ammonia, and recovering the resultant 3-[2-(5,6,7,8,9,9-hexachloro-1,4,4a,5,8,8a-hexahydro-1,4,5,8-dimethanonaphthyl)methyl]-pyridine.

13. A process for the preparation of a halo substituted polycyclic derivative of a nitrogen-containing heterocyclic compound which comprises condensing 1,2,3,4,6,7,7,9,9- octachloro - 1,4,4a,5,8,8a - hexahydro - 1,4,5,8 - dimethanonaphthalene with 4-picoline in the presence of lithium amide in liquid ammonia, and recovering the resultant 4-[2 - (3,5,6,7,8,9,9 - heptachloro - 1,4,4a,5,8,8a - hexahydro-1,4,5,8-dimethanonaphthyl)methyl]-pyridine.

14. A compound selected from the group consisting of (halo - 2,5 - norbornadiene-2-ylmethyl)pyridine and [2-(halohexahydro-dimethanonaphthyl)methyl]-pyridine.

15. (Chloro-2,5-norbornadiene-2-ylmethyl)pyridine.

16. [2 - (hexachloro - hexahydro - dimethanonaphthyl)methyl]-pyridine.

17. 3-(3-chloro-2,5-norbornadien-2-ylmethyl)pyridine.

18. 3 - (1,3,4 - trichloro - 2,5 - norbornadien - 2 - ylmethyl)pyridine.

19. 4 - (1,3,4,7,7 - pentachloro - 2,5 - norbornadien-2-ylmethyl)pyridine.

20. 3 - [2 - (5,6,7,8,9,9 - hexachloro - 1,4,4a,5,8,8a-hexahydro - 1,4,5,8 - dimethanonaphthyl)methyl] - pyridine.

21. 4 - [2 - (3,5,6,7,8,9,9 - heptachloro - 1,4,4a,5,8,8a-hexahydro - 1,4,5,8 - dimethanonaphthyl)methyl] - pyridine.

No references cited.